April 27, 1965 R. E. ROEGER ETAL 3,180,031
ROUNDNESS ANALYZING APPARATUS AND METHOD
Filed Oct. 7, 1959 2 Sheets-Sheet 1
FIG. 1
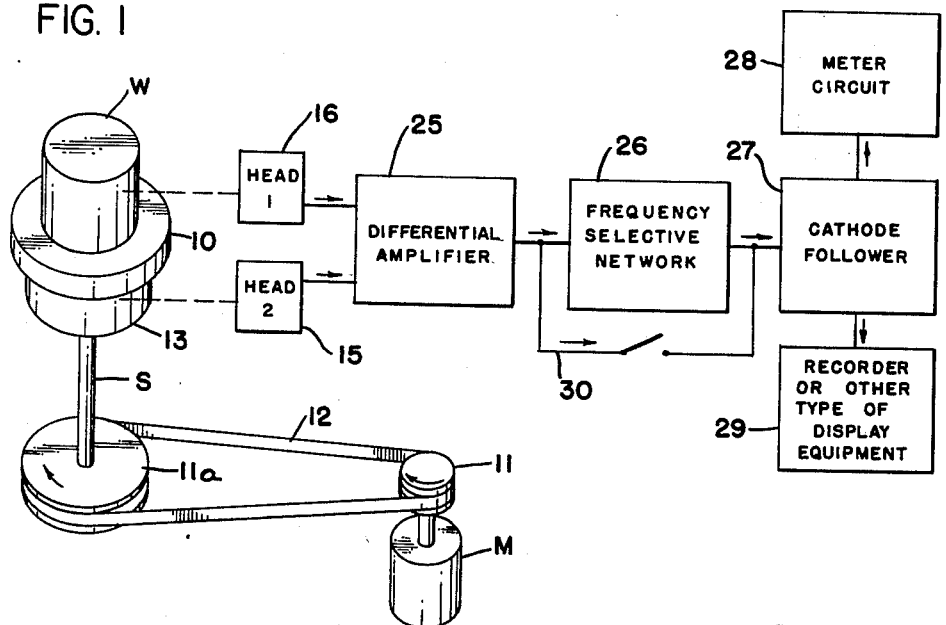
FIG. 2
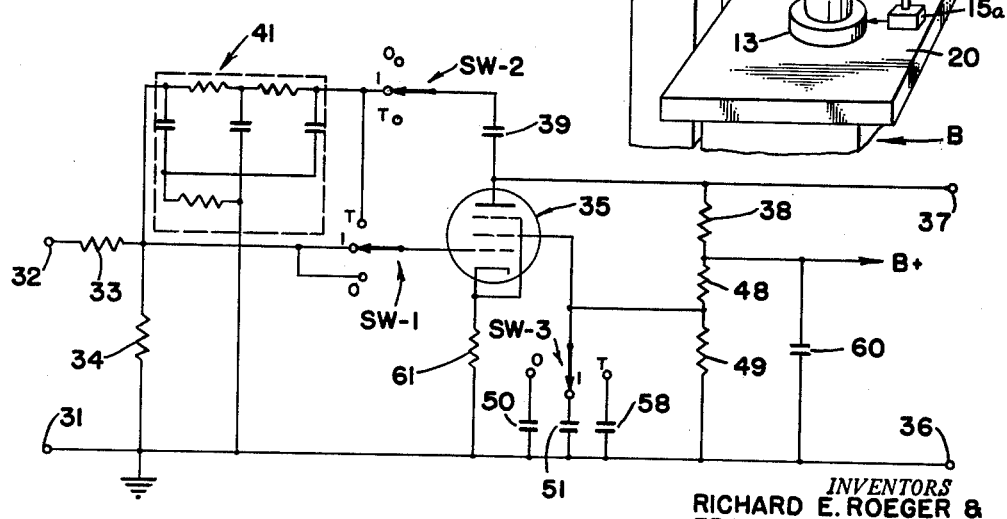
FIG. 4
INVENTORS
RICHARD E. ROEGER &
FREDERICK W. WITZKE
BY
Williams, Tilberry & Holrick
ATTORNEYS INVENTORS
RICHARD E. ROEGER &
FREDERICK W. WITZKE
BY
Williams, Tilberry + Gobrick

ATTORNEYS

United States Patent Office 3,180,031
Patented Apr. 27, 1965

3,180,031
ROUNDNESS ANALYZING APPARATUS
AND METHOD
Richard E. Roeger, Brecksville, and Frederick W. Witzke,
Independence, Ohio, assignors, by mesne assignments,
to The Bendix Corporation, Detroit, Mich., a corporation of Delaware
Filed Oct. 7, 1959, Ser. No. 844,912
23 Claims. (Cl. 33—174)

The present invention is concerned generally with the art of testing or analyzing the roundness of an object; more specifically with a method and apparatus utilizing electrical-mechanical means for analyzing roundness characteristics of an object through radial variations thereof; and particularly pertains to an electrical-mechanical method and apparatus by which may be achieved a type of harmoic analysis of a surface in terms of the absence or the extent of presence of each of several types of lobed characteristics by electronic means selecting each particular characteristic to be determined. It may be noted at this point, however, that the invention described herein has application to other than those which are specifically and strictly roundness analyzing procedures.

For purposes of convenience in the discussion of the invention herein disclosed, the general subject matter will be discussed in terms of testing of cylindrical work pieces, that is, testing of an actual surface intended to be circularly cylindrical for variation from a theoretical and perfect circularly cylindrical surface. Nevertheless, discussions of the general problem, the general test procedure and apparatus therefor, and desired results, are applicable to problems of testing of other surfaces intended to approach theoretical surfaces of revolution, such as conical surfaces for example.

Because of the common occurrence of so-called "lobed" shapes in ground or machined surfaces intended to be cylindrical, old conventional geometric means for checking roundness by indicator gauge type devices engaging a test piece at diametrically opposed points, with several diametric measurements being taken around the circumference of the piece, have been found almost completely unsuitable and unreliable for general test purposes, because lobed shapes with an odd number of lobes often present an apparently constant diameter. Further, other geometric type instruments employing a V-block and a gauge for three-point contact with the test piece in like fashion have been found unsuitable for general testing application. In some such V-block type devices where the nature of the lobed characteristics of the test piece is antecedently known from other sources, the selection of a particular V-block angle and application of a corresponding formula to the derived indicator reading data may provide suitable out-of-roundness information. However, the need of selecting a particular V-block angle and of antecedent knowledge of the lobed or roundness characteristic type of the workpiece to be tested, and as well the relative cumbersomeness and test time consumption involved have led to the use of electrical methods and devices measuring or indicating variations in radius of a workipece.

Among apparatus of the latter type, there have been developed two classes of mechanical-electrical devices employing an electrical gauge head or transducer head having a sensing element in contact with the tested workpiece surface and mechanism for producing relative rotation of the workpiece and the head. With the radial spacing of the test head or transducer head from the axis of rotation held constant, movement of a work contacting sensing element produces a signal indicative of or corresponding to the radial variation of the tested surface relative to the axis of rotation of the system. The transducer signal amplified as required is applied as the input to a display device usually calibrated on some scale of linear measurement. In some cases, the display device is merely a meter indicating the total or maximum variation in radius; while in others a chart recording instrument is used, such as a polar recording chart rotationally driven synchronously with the workpiece, so that the chart tracing is indicative of the radial variations from point to point around the circumference of the object at the actual region being tested. In the case of the polar chart recording device, the chart must then be analyzed and interpreted by the operator, bearing in mind that the amplification of a signal representing a radius variation measurement may lead to a trace of form quite different from the surface form, though having a definite relation thereto. Similar apparatus has been used to check radial surfaces for axial variations.

In such prior electrical-mechanical devices, the relative rotation between workpiece and the transducer or gauge head is achieved either by rotating the part to be tested relative to a stationary head or, conversely by rotating the gauge head itself about a fixed workpiece. In either case, for precision and optimum performance both in procedural convenience and results, a precision spindle is necessary for the support of the rotated workpiece or for support of the rotated gauge head, since any appreciable wobble or radial slop in the spindle will, of course, affect the gauge head, so as to obscure or completely mark the true picture of the surface character. With the device of both types any eccentricity of the workpiece relative to the axis of rotation likewise will affect the gauge head in an undesirable fashion.

Now in a lobed condition or shape, the surface considered on a certain order of magnitude, which is of interest for test purposes, presents regions of maximum radii with intervening regions of minimum radii, "maximum" and "minimum" being considered relative to adjacent regions. Thus, a circumferential form elliptical at a given region would be a two-lobed condition; a form having maxima 120° apart, a three-lobed condition; a form having maxima 90° apart, being four-lobed; and so on for a generalized designation as an N-lobed condition. For the present discussion, as will appear, mere eccentricity of a precision round surface, relative to a particular axis selected in an object itself or even relative to the axis of rotation may be considered to be a one-lobed condition. Although more complex surface conditions may occur—in effect compound forms of lobedness whether symmetrical or not—these may be considered as composed of and analytically resolved into component simpler lobed forms.

The present invention utilizes the fact that out-of-roundness generally occurs as a lobed shape or as a shape which may be interpreted as or in terms of a lobed condition; and also the fact that a lobed form, for example a symmetrical three-lobed shape, upon rotation about an axis coincident with the center of symmetry, say at one revolution per second, with respect to given point such as a transducer head contact will exhibit a pattern of radial variation relative to the axis of rotation which repeats three times per second. Thus, a transducer head having a sensing contact bearing on the surface will then generate a signal of three c.p.s. frequency, which is characteristic of the particular surface lobed form and which may be used to provide a meter input or recording chart input displaying the transducer behaviour for visual observation as has been done in the pior art. However, where a compound shape is present, or the workpiece is not centered relative to the axis of rotation, or the spindle of the rotating part of the mechanism wobbles, a correspondingly more complex signal wave form appears—a composite of the signals attributable to the tested surface, the spindle error, and eccentricity. Even where spindle error and eccentricity are not present, analysis of the trace of a complex shape into the components may require some considerable skill and time. The present invention, however, derives a signal from a transducer contacting the test-piece, and by selection of relative rotational speed with respect to the frequency passing characteristic of a frequency selective network, achieves an analysis of the piece by obtaining separate data for the absence or extent of each of one or more types of lobing.

This is achieved by using a constant rotational drive speed for simplicity of the mechanical end of the apparatus, and a frequency selective network may then be used which is adjustable to pass as successively selected a fundamental frequency for example, equal to rotational speed in revolutions per unit time and, for practical purposes a limited number of frequencies multiples or higher harmonics thereof, or at least a plurality of such frequencies. Alternatively, a fixed frequency selective network may be used with drive means adapted for constant speed rotational driving at a speed in revolutions per unit time equal to the frequency passed by said network and at other speeds sub-multiples thereof. The frequency component thus selected is ultimately applied to a visual display means to show the extent of an out-of-roundness condition corresponding thereto. However, detailed discussion of the rotaitonal speeds and frequency selection characteristics is hereinafter presented.

There is also disclosed an electrical-mechanical means for minimizing the effect of spindle error or wobble, in practical sense obviating the need for a costly precision spindle in the rotating system; such means being capable of counter-acting spindle error as it occurs, rather than relying upon a fixed correction means built into the system to correct for a spindle error known to exist at some past time as has been done in the prior art. Further there is disclosed means for determining, if desired, and for obviating in practical sense the effect of any eccentricity in location of the test piece or surface from the axis of rotation. More specific procedure and apparatus embodying the invention will appear in the detailed description hereinafter given.

The general object of the present invention is then the provision of an improved method and means for mechanical-electrical roundness testing. Another object is the provision of improved method and apparatus for roundness testing through variations in radius. Another object is the provision of roundness testing apparatus obviating need for a precision spindle. Another object of the invention is the provision of method and apparatus for roundness testing based on sensing variation in test surface radius which obviates need for precise centering of a part relative to a turntable or other rotatable element, yet obtaining conveniently interpreted results.

Another object of the present invention is the provision of method and apparatus for obtaining a direct indication of eccentricity of a test surface relative to an axis of rotation. Another object is to provide method and apparatus for obtaining direct indication of the extent of each of the out-of-roundness conditions usually characterized as two, three, and higher lobed shapes, which may be considered as geometrical components of a single surface form actually present in a test piece. Another object is the provision of a method and apparatus of the type described providing also an indication of total out-of-roundness. Other objects and advantages of the invention will appear from the following description and the drawings wherein:

FIG. 1 presents in block form the electrical circuitry and in simplified generalized form the mechanical components of an apparatus for carrying out the present invention;

FIG. 2 represents in manner similar to FIG. 1 another arrangement of the mechanical components for carrying out the invention;

FIG. 4 is another form of frequency selective network for another manner of carrying out the invention;

Figure 5A:
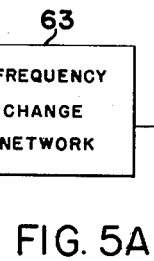
Figure 5B:
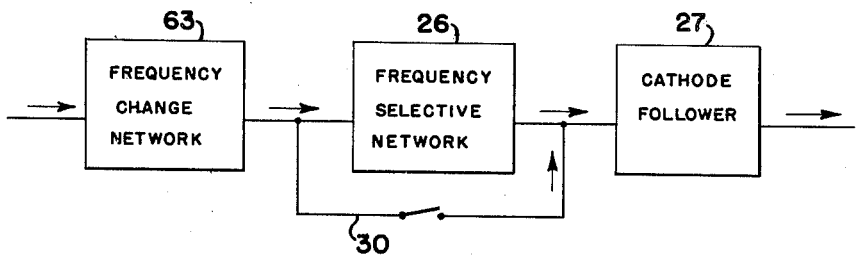

FIG. 5A in block form indicates another variation which may be adopted in overall circuitry; and FIG. 5B in block form indicates still another variation which may be incorporated in overall circuitry.

In FIG. 1 of the drawings a simplified and generalized representation of an apparatus for carrying out the invention appears wherein the schematically shown mechanical portion of the apparatus comprises a turntable 10 having rotational support through a spindle assembly S in a base or frame structure (not shown) with mechanism for driving, at a chosen constant speed, the turntable and hence the work or test piece W supported on the horizontal surface of the turntable. The driving mechanism here includes the motor M adapted for operation at at least one constant speed, and transmitting motion through motor pulley 11, belt 12, a larger spindle pulley 11a and spindle S to the turntable, in a speed reducing system. There is also shown a master disk 13 having a precision round or cylindrical peripheral surface precisely centered relative to the spindle axis, which is preferably located immediately below the turntable to be as close as possible to the test piece W for purposes to be explained. Since the shape and mass of the test piece and the selected turntable speed may be such that frictional forces hold the same in one position, and since conventional clamping means are well known, for simplicity of the drawing, no work clamp or chuck device is shown; but such may be provided where required.

The two similar transducer heads 15, 16, having contact points or sensing elements bearing respectively on the precision round surface and the surface to be analyzed in W, are each adapted to alteration of an electrical characteristic corresponding to the sensing element movement radially of the rotational axis of the system; that is, here to produce an output signal corresponding to radial variations in the surfaces contacted relative to the axis of rotation. Linear variable differential transformer type transducers, for example, may be used. The transducers are mounted in such fashion that they are fixed in axial and radial position relative to the turntable and precision surface, although preferably adjustably mounted on the apparatus base, particularly so 16 for testing various axial regions on a given piece and for readily accommodating pieces of different diameters. The contacts of the transducers are co-planar in a plane including the axis of rotation, the heads being then disposed parallel to each other, thereby providing a simple means of mixing the signals in proper phase relation—no more than simple polarity changes being required under varying conditions—without need of phase shifting circuitry as would be required were the heads at some angular relation to each other.

By the described transducer means, the mechanical end of the system is, of course, linked to the electrical circuitry shown in block diagrammatic form, wherein an amplifier means 25, to which the transducer means furnishes the input, in turn provides an output signal applied as input to a frequency selective network 26; the selected frequency output of the latter being applied through an isolation or buffer stage 27 such as a cathode follower stage to display means for visual indication of an out-of-roundness characteristic, the display means usefully comprising circuitry 28 including a panel meter and circuitry 29 for a chart recorder, an oscilloscope or other device presenting a visual trace. Means for effectively by-passing the entire amplifier output past the network through the cathode follower to the display means is generally indicated by line 30.

At this point, in FIG. 2 may be noted another form of the mechanical part of the apparatus, whereby relative rotation of transducer means and test piece is obtained, wherein B is a rigid base or frame including a horizontal table 20 and an overhanging rigid arm 21, and enclosing driving mechanism for the vertical spindle S rotatably supported in the arm 21. The parallel disposed transducers 15a and 16a contacting surfaces of the precision disk 13a and work W are carried on the spindle S to rotate therewith at fixed distances from the rotational axis. Here again the precision surface of 13a is precisely co-axial with the axis of rotation and spindle S is driven at at least one constant speed, say by mechanism as described for FIG. 1, gearing or other known suitable mechanism. The disk 13a is however, mounted on the table for mechanical simplicity, rather than being on the spindle with the corresponding transducer mounted on the frame. In the mechanical form of FIG. 2, slip-ring means would have to be used to bring the transducer leads out of the rotating system. Reference may be had to the Reason U.S. Patent No. 2,723,461 for an apt spindle mounting and slip-ring arrangement (showing only one transducer carried by the spindle and a gearing drive meachanism) in which, however, the slip-ring connections would have to be increased to handle two transducers. Since the circuitry to be described may be the same and similarly operable for a mechanical system according to FIG. 1 or FIG. 2, the latter will have no further discussion, and the explanations of the invention will be in terms of FIG. 1.

Returning to FIG. 1, the signals or outputs of the transducers are fed to a differential amplifier 25 and there mixed in proper phase relation for cancellation, in any signal deriving from head 16, of any component due to spindle error or wobble. Where an outer surface is tested on W, spindle wobble or error (by shift of the spindle axis among parallel positions, or shift of the spindle axis direction with the common axis point either well above or below the work W and the disk 13) will result in a signal at head 15 instantaneously of the same polarity as the spindle error component in the signal from 16, with the transducer contacts on the same side of the axis of rotation; but with the contacts on opposite sides of the axis (i.e., diametrically opposite since coplanar) there will be a 180° phase difference. Also where an internal surface is analyzed with both contacts on the same side of the axis, there will be a 180° phase difference. Accordingly, the relative polarity of the transducer output leads, or of the two inputs into a mixing stage in the amplifier will be chosen as known to the art to obtain the 180° phase relation at the point of mixing.

For most good quality but non-precision spindle assemblies which are readily available commercially or easily fabricated for mounting the turntable, the error will be of the type assumed in the previous discussion, and as a practical matter the signals derived from transducers 15, 16 matched in sensitivity may be mixed without further consideration of geometry for acceptably cancelling spindle error. In such manner, need of a precision spindle is obviated, although theoretically in the case of shift in the direction of the spindle axis, the difference in distances of the precision disk and the tested region and hence of the heads—respectively from the intersection point of the actual and average (or intended) spindle axis, would require that the correction signal derived from 15, at least as a first approximation, be multiplied by the ratio of the respective distances, either by different amplification, by use of voltage dividing networks, other known extrinsic means, or by use of transducers of selected different sensitivities. For example, where the head 16 is eleven inches and head 15 ten inches from the common axial point, the total excursion of the spindle at the level of head 16 would be about 11/10 of that at 15, the signal component in 16 due to spindle error would be about 11/10 of the signal in 15 with equally sensitive heads, and so the head 15 could be selected to have a sensitivity 11/10 that of 16. However, since this relative sensitivity selection is based on head locations, and this theoretically requires different heads in case the head 16 is to be axially adjustably positioned, in such case the relative strength or level of the spindle error cancelling signal derived from head 16 may be set by adjustment of some circuitry component between head and point of mixing, as will be evident to those skilled in the art.

The effect of spindle error having been eliminated, at least on the order of magnitude of acceptable test accuracy, the output of the amplifier 25, hence input to the network 26 is thus a signal comprised of components representative of the surface condition of the work tested, including eccentricity of the work axis relative to the axis of rotation. It should be noted here that where, in fact, the spindle-caused error is negligible for the desired test accuracy, the head 15 and, therefore, error cancellation signal mixing circuitry are unnecessary, so that amplifier 25 may be any amplifier adapted to the transducer 16 alone.

Figure 3:
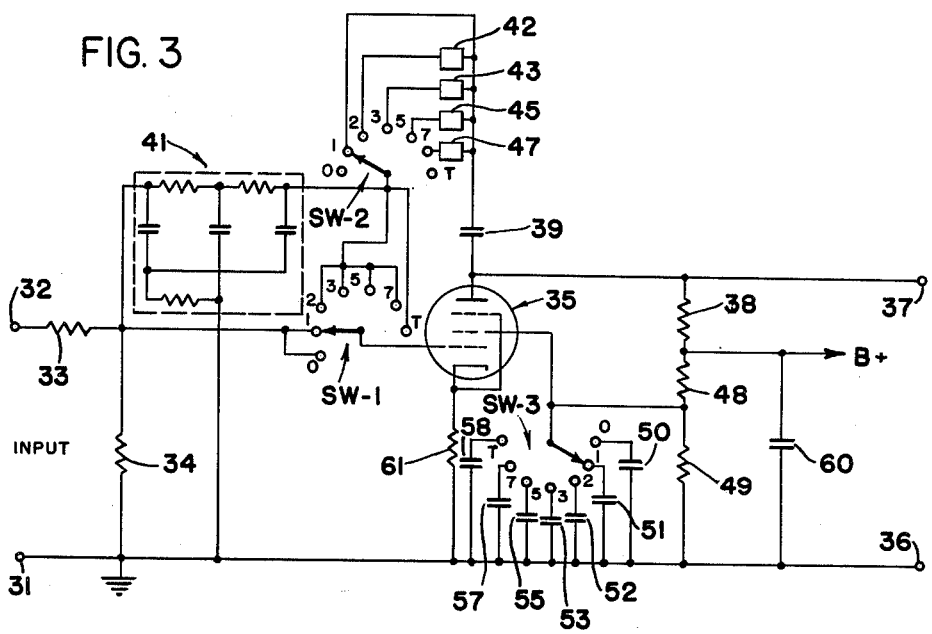
FIG. 3 is one form of a frequency selective network which may be used for one manner of practicing the invention.

The frequency selective network 26 may be one of two broad types, either a network type passing a plurality of definite frequencies individually where the tuntable or spindle is driven at only one constant speed throughout the complete analysis of one region of a test piece; or a network passing a single frequency with the turntable or spindle driven at different constant speeds—either by changeable speed-transmission means in the driving mechanism, or by motor control and motor circuitry whereby the motor may be driven at a plurality of constant speeds. FIGS. 3 and 4 are schematic diagrams of circuitry embodying networks of these respective types, which are practical for the intended purpose; each being basically a voltage amplifier circuit operated at a gain of 1. Similar or analogous components are designated by like reference characters in the two figures.

In FIG. 3, the input terminals 31, 32 for the output of amplifier 25 are respectively grounded and connected to dropping resistor 33; a grid bias resistor 34 being connected between the grid side of 33 and ground. The input is selectively applied to the grid of a pentode 35 such as a 6AK5 through section Sw–1 of a three-gang rotary switch, either directly when the switch is set at joined contacts 0, 1; or indirectly through the top arms of a "first harmonic" or "fundamental" blocking filter network 41 (a bridged type resistance-capacitance T-filter with bottom arm to ground), when the switch is set on any of the commonly connected contacts 2, 3, 5, 7 and T; the connection of the input to the grid through Sw–1 on setting "0" providing the by-pass means 30 of FIG. 1. The network output leads on terminals 36, 37 are connected respectively to ground and to the plate which has its load resistor 38, of course, connected to the positive side of the B supply. Filter networks 42, 43, 45 and 47 are similar in configuration to 41; but as 41 is adapted to reject a selected frequency termed the fundamental, and pass all others in the range of frequencies here of concern, the other networks are adapted respectively to reject frequencies which are the second, third, fifth and seventh harmonics of the fundamental, passing others. For selective negative feed back from plate to grid, the arm in a second section Sw–2 of the ganged switch is commonly connected to the joined contacts 2, 3, 5, 7 and T in Sw–1 and to the right arm of 41; the contact 1 in Sw–2 being connected directly, and contacts 2, 3, 5, 7, respectively through filters 42, 43, 45, 47 to the plate supply blocking capacitor 39 and hence to the plate and output, contacts 0 and T being unused.

Hence with the gang switch set at "0," the entire input is applied to the control grid with no plate-grid feed back, providing in effect a by-passing of the network; with a switch setting at T, although again there is no plate-grid feed back, the input is applied to the grid through 41 so that fundamental is lacking in the output. With a setting at "1," the entire input frequency spectrum is again applied to the grid, but negative feed-back through 41 of all but the fundamental blocked thereby thus permits only the fundamental to appear in the output. With settings at 2, 3, 5, 7, all frequencies except the fundamental are applied through 41 to the grid, but as only the repectively numbered harmonics are eliminated from the plate-grid feed-back, only one harmonic can appear in the output, a distinct harmonic, for each of these settings. The network is designed to pass the above-named harmonics as being the most common and useful in out-of-roundness analysis, but the network could be extended on the same principle for other harmonics by increasing the T-filter sections for feed back.

In FIG. 3, the resistors 48, 49 acros the B supply as a voltage divider provide the required screen grid operating potential, the grid by-pass capacitance being selectable by the third section Sw–3 of the gang switch among capacitors 50, 51, 52, 53, 55, 57, 58 connected between ground and the respective contacts 0, 1, 2, 3, 5, 7, and T therein. At 60 appears the usual plate supply by-pass capacitor, and a small cathode bias resistor 61 may be used as required. The circuit is operated as close as practically possible to 100% feed back for all frequencies, except of course for the frequency selectively blocked by the filter network through which the feed back is obtained. Even though the circuit may not be theoretically 100% selective, at various settings, it is so for practical purposes. The screen by-pass capacitor values are chosen to prevent the circuit from acting as an electron coupled oscillator. The cathode bias resistor 61, is either a fixed or variable resistor with effective resistance empirically selected to improve output wave form.

In FIG. 4, only the T-filter network 41 is present, and the sections of the three gang switch each require only three rather than the seven contacts of FIG. 3. Only contact 1 of Sw–2 is used, with the result that only at setting "1" is plate-grid feed back obtained. Hence at setting "0" the entire input is applied to the grid and a corresponding output is obtained to provide again the effect of by-pass means 30 in FIG. 1. At setting "1," though the entire input is applied to the grid, negative feed back through 41 of all the frequency spectrum but that blocked in 41 results in an output with only that one frequency. At setting "T," through 41 all the input except the blocked frequency is applied to the grid and appears in the output.

Since in some cases there may be no need to account for a spindle error, and since the test part rotation and related frequency selective aspects of this invention may be applicable even with a precision spindle mechanism; for simplicity in further discussion of operation, unless otherwise stated, even the corrected output signal of the amplifier 25 will be dealt with as the output of the head 16. So also, where turntable or work piece rotation is discussed, the mechanical operation not only of FIG. 1, but also FIG. 2, is comprehended since relative rotation between work and transducer 16 or 16a is present in both. First operation with the frequency selective network of FIG. 3, then that of FIG. 4 will be taken up.

Assuming a perfectly centered workpiece, consider now a two lobed condition say of an elliptical periphery on the workpiece. Each rotation of the turntable then results only in a radial excursion of the work head contact point giving a signal frequency of two cycles per revolution, since a signal maximum will be reached at the opposite ends of the major axis of the ellipse, that is, at the "lobes," and a signal minimum will occur at the intervening alternating locations corresponding to the minor axis. A workpiece having a simple 3, 4 . . . or N-lobed condition will in similar fashion result in a similar corresponding respective frequency in the test head output signal of 3, 4 . . . or N-cycles per revolution. A perfectly round workpiece with axis eccentric to the axis of rotation will give a one cycle per revolution signal, in effect a one lobed condition. For a given constant speed of rotation, say 60 r.p.m., the frequencies then would be 1, 2 . . . N c.p.s.; for 120 r.p.m. or 2 r.ps., 2, 4 . . . 2N c.p.s. for 1, 2 . . . N lobedness; in other words, $f_t = N \cdot r$, where $f_t$ is the transducer output frequency, N the number of lobes and $r$ the rotational speed; and $f_t$ will equal $f_s$, the frequency which network 26 must pass with the circuitry of FIG. 1.

Where a pure or simple symmetrically lobed condition occurs on a workpiece which is eccentric, a more complex head signal occurs, in effect composed of a fundamental due to the eccentricity and a component equivalent to the Nth harmonic of the fundamental where N is the simple type of lobedness present. Also even a centered piece will give a more complex signal where the out-of-roundness is not a simple pure lobed type, but such signal will be analytically resolvable into component harmonics, to each of which there corresponds a lobed condition which may be considered as a "geometric component" of the surface configuration. Now with the workpiece driven at one constant speed, say 60 r.p.m. and an adjustable network used at 26, such as that of FIG. 3, then filter networks 41, 42, 43, 45 and 47 will be designed to block frequencies respectively of 1, 2, 3, 5, and 7 c.p.s. The test would then proceed by bringing the contact of 16 to bear on the peripheral region to be tested (with 15, of course, in contact with 13, where used), and then obtaining display-presented data for the rotating piece for each of the settings of the gang switch.

A perfectly round and centered workpiece, generating no signal (except perhaps for a relatively high frequency due to surface roughness, which in any event will not pass network 26) will, of course, display no reading at 28 or 29. A round piece off-center from the rotational axis, giving a 1 c.p.s. signal at 16, will give essentially the same reading at settings "0" and "1" as the "total out-of-roundness including eccentricity" and as the eccentricity; but will give no reading at other settings, including the setting at T for "total out-of-roundness excluding eccentricity."

A piece having a simple lobed characteristic of N-lobes where N is 2, 3, 5, or 7, if perfectly centered will give a reading only at one of the switch setting numbers above given corresponding to N; since only a frequency N is generated and it can pass 26 only at the N setting. If such piece is eccentric, and say $N=7$, then readings will be obtained at setting "1" showing the eccentricity; at "7" for the radial extent of the lobeness, with an identical reading at "T" for the total out-of-roundness excluding eccentricity; and at "0," for the total out-of-roundness including eccentricity, in other words equal to the sum of readings at "1" and "7."

Where the workpiece is more complex but centered, say the equivalent of composition of pure two and a pure three lobed form, then, of course, readings will be obtained at settings "2" and "3," also identical readings at "0" and "T" equal to the sum of readings at "2" and "3," since eccentricity is zero. If eccentricity is present, a reading therefore will appear at the setting "1"; and readings at "0" and "T" will differ by the value of the reading at "1."

In actual testing then the readings or data will be obtained at all settings yielding data presenting the extent that each of the 2, 3, 5, 7 lobed conditions are present in the piece, the total of them, and the eccentricity. When the piece is mounted with a designated axis actually aligned with the rotational axis, then the eccentricity of a particular surface relative to that designated axis may also be determined from a setting at "1." The procedure may then be repeated at various axially different locations on a particular surface, or at different surfaces in a single piece.

Where a network 26, passing essentially one harmonic is used, as that of FIG. 4 on switch setting "1," the turntable, or work is driven at a selected plurality of constant speeds, again selected by the relation $f_s = N \cdot r$, where $f_s$ is again the frequency passed by network 26, N the lobed condition sought and $r$ the rotational speed, in consistent units. In FIG. 4 with filter network 41 designed to block a 2 c.p.s. frequency, then at setting "1" only a 2 c.p.s. signal passes to the output. Hence for complete testing of a surface for the lobeness components 1, 2, 3, 5, 7, the work on test piece will be driven at 120, 60, 40, 25, 17½ r.p.m. to result in a 2 c.p.s. signal arising respectively for eccentricity, 2, 3, 5 and 7 lobed conditions or components.

In this method of operation then a round centered piece yields no signal in head 16 (apart from microroughness of surface perhaps as previously noted relative to FIG. 3); and hence no readings for switch settings "0," "1," or "T," at any of the listed speeds. A round eccentric piece for setting "0" again will give a "total out-of-roundness including eccentricity" at any speed, which is, of course, the eccentricity; at setting "T" and 120 r.p.m. will give the "total out-of-roundness excluding eccentricity" reading, here zero; and at setting "1," will give a reading only at a speed of 120 r.p.m., which again will be a "fundamental" or first harmonic reading corresponding to the eccentricity. At this point, it should be noted that the "total out-of-roundness excluding eccentricity" reading is to be obtained in general only at 120 r.p.m. and the "T" setting.

A piece simply out-of-round, say with a three lobed condition, but centered, will give a reading on setting "1" only at a 40 r.p.m. driving speed, for the extent of the three lobed condition specifically; at setting "0" will give the same reading for a "total out-of-roundness including eccentricity" at any speed; at setting "T" and 120 r.p.m. will again give the same reading for "total out-of-round excluding eccentricity." Were the surface eccentric, then on setting "1" at 120 r.p.m., a reading for the eccentricity alone would also be obtained, as well as the 40 r.p.m. reading; at setting "T" and 120 r.p.m., the reading would be the same as for the centered piece; and at setting "0" at any speed the reading would now be different than for the centered piece, since both eccentricity and the three lobed condition would appear in the total.

With a more complex form in the tested surface, say including a two and three lobed condition, the individual extent of these would appear respectively for setting "1" at 60 and 40 r.p.m., the total including any eccentricity present at any speed on setting "0" and the total excluding eccentricity at 120 r.p.m. on setting "1." A single systematic general procedure avoiding confusion for any test would be to proceed through the 17½, 25, 40, 60 and 120 r.p.m. speeds taking the readings or data on setting "1," then at 120 r.p.m. to take the two "total" readings.

In the foregoing apparatus and method based upon rotational speed and frequency selection according to the defined relation $f_s = N \cdot r$, the frequency or frequencies to be passed by the network 26 have been chosen primarily to permit relatively low rotational speeds to be used, while yet not demanding in the electronic end of the apparatus components of circuitry which are either unduly costly or complex, or critical or unusual in physical or electrical specifications. Also at any operating conditions for checking the presence of an N-lobed component in the surface form, the output signal from 26 likewise has the same frequency as does the component in the output of head 16 corresponding to the N-lobed component of the surface, and this frequency is numerically equal to N. However, it is not necessary that this identity be used.

Thus, where no more is required than a panel meter indication or reading of the radial variation due to each of the lobed conditions, with the single speed drive and the FIG. 3 type adjustable network used for 26, the drive could be some other speed, say 120 r.p.m. giving signals of 2, 4, 6, 10 and 14 cycles per revolution and per second respectively for the 1, 2, 3, 5, and 7 lobed conditions; in which case the filter networks 41, 42, 43, 45, and 47 would be designed to block, and the overall network 26 thereby to pass, such frequencies ultimately to provide the meter input. However, if even at such different speeds, for example, an equal numerical frequency correspondence of the display instrument input to the lobed conditions represented is desired, this must be obtained, as indicated by the block diagram of FIG. 5A, by interposing a frequency change network at 63, to produce a frequency half the frequency of signals from 26. Or if the rotational drive speed were doubled with the frequency-passing characteristics of 26 as first described relative to FIG 3, a frequency halving network 63 would be inserted between amplifier 25 and the network 26 as in FIG. 5B. Or it might be desired to rotate the test piece at rates lower than those for which a network is designed or can be acceptably designed, in which case a frequency change network 63 as in FIG. 5B, would serve to increase the frequency to 26. Similar considerations would apply where a FIG. 4 selector is in question.

As to the display instruments, the meter circuitry 28 is conveniently that of a peak-reading voltmeter, many of which are known to the art, to hold the maximum of a signal corresponding to any out-of-roundness characteristic checked, or a maximum-minimum meter. The trace recording means 29 may be a linear or polar chart recorder, or an oscilloscope. A chart is, of course, to be driven at a constant rate, correlated to the actual relative rotational rate. In the case of a polar chart driven at the same rate as the work, and with the frequency selecting characteristics of 26 determined from $f_t = f_s = N \cdot r$, the trace for any given lobed condition will conveniently have a corresponding number of maxima; but if at a different speed, such correspondence will require a frequency change to be effected by a network 63 in the ratio of the chart speed to work speed. For an ordinary oscilloscope at 29, the sweep frequency is set at the same rate as the rotational work speed for each set of test conditions to obtain a unit pattern having, if any, maxima equal in number to the lobed condition intended to be found at such conditions.

We claim:

1. In an apparatus for analyzing or testing the roundness of a test piece: transducer means and means for supporting a test piece for relative rotation between said transducer means and test piece about an axis, driving mechanism for effecting said relative rotation at only a single speed, said transducer means including a transducer head having a sensing element in contact with the surface of the piece to be analyzed and adapted to produce an output signal varying with variations in the radial distance of the surface of the piece from the said axis, amplifying means for the transducer output providing an amplified signal, frequency selective network means to receive the amplified signal and being adjustable to pass any one of a selected group of distinct frequencies having harmonic relations to each other to appear as the network output, and means to which the network output is applied responsive to the magnitude of the selected frequency signal and calibrated for display of radial variation of the test piece surface, and said selected frequency being equal to the product of the relative rotational speed in revolutions per second and N, N being the number of a lobed condition for the absence or extent of which it is desired to analyze the test piece.

2. Apparatus as set forth in claim 1, having selectively operable means for completely by-passing said amplified signal by said frequency selective network for obtaining a total out-of-roundness display including eccentricity of the tested surface of the test piece relative to said axis.

3. Apparatus as set forth in claim 1 having a selectively operable frequency selective means adapted to by-pass all of said amplified signal except a component of frequency equal to the constant relative rotational speed.

4. In a apparatus for analyzing or testing the roundness of a test piece: transducer means and means for supporting a test piece for relative rotation between said transducer means and test piece about an axis, driving mechanism for effecting said relative rotation at a selected constant rotational speed, said transducer means including a transducer head having a sensing element in contact with the surface of the piece to be analyzed and adapted to produce an output signal varying with variations in the radial distance of the surface of the piece from the said axis, amplifying means for the transducer output providing an amplified signal, frequency selective network means to receive the amplified signal and permit only a preselected frequency to appear as the network output, means to which the network output is applied responsive to the magnitude of the selected frequency signal and calibrated for display of radial variation of the test piece surface, said selected frequency being equal to the product of the relative rotational speed in revolutions per second and N, N being the number of a lobed condition for the absence or extent of which it is desired to analyze the test piece, means providing a circumferential precision round surface precisely concentric with the said axis and radially fixed relative to a test piece, second transducer means having a sensing element in contact with said precision round surface, points of contact of said sensing elements lying in a common plane through the said axis, said second transducer means being adapted to provide a signal corresponding to wobble in said axis, and means for mixing the last said signal with a signal derived from the first transducer head to cancel any component in the last said signal due to said wobble.

5. In apparatus as set forth in claim 4, wherein the driving mechanism is adapted to effect said relative rotation at only a single constant speed, and wherein the said frequency selective network means is adjustable to pass any one of a selected group of distinct frequencies having harmonic relations to each other.

6. In apparatus as set forth in claim 5 having selectively operable means for completely by-passing said amplified signal by said frequency selective network for obtaining a total out-of-roundness display including eccentricity of the tested surface of the test piece relative to said axis.

7. In apparatus as set forth in claim 5 having selectively operable frequency selective means adapted to by-pass all of said amplified signal except a frequency equal to the constant relative rotational speed.

8. In an apparatus for analyzing or testing the roundness of a test piece: a base, transducer means, turntable means including a spindle journalled in the base for supporting a test piece for relative rotation between said transducer means and test piece about an axis, driving mechanism driving said turntable for effecting said relative rotation at only a single constant speed, said transducer means including a transducer head having a sensing element in contact with the surface of the piece to be analyzed and adapted to produce an output signal varying with variations in the radial distance of the surface of the piece from the said axis, said transducer means being mounted on the base and adapted to be held at a selected position relative radially to said axis and axially relative to said turntable, amplifying means for the transducer output providing an amplified signal, frequency selective network means to receive the amplified signal, and permit only a preselcted frequency to appear as the network output, said frequency selective network means being adjustable to pass any one of a selected group of distinct frequencies having harmonic relations to each other, and means to which the network output is applied responsive to the magnitude of the selected frequency signal and calibrated for display of radial variation of the test piece surface, and said selected frequency being equal to the product of the relative rotational speed in revolutions per second and N, N being the number of a lobed condition for the absence or extent of which it is desired to analyze the test piece.

9. Apparatus as set form in claim 8, having selectively operable means for completely by-passing said amplified signal by said frequency selective network for obtaining a total out-of-roundness display including eccentricity of the tested surface of the test piece relative to said axis.

10. Apparatus as set forth in claim 8; having selectively operable frequency selective means adapted to by-pass all of said amplified signal except a component of frequency equal to the constant rotational speed of the turntable.

11. In an apparatus for analyzing or testing the roundness of a test piece: a base, transducer means, turntable means including a spindle journalled in the base for supporting a test piece for relative rotation between said transducer means and test piece about an axis, driving mechanism driving said turntable for effecting said relative rotation at a selected constant rotational speed, said transducer means including a transducer head having a sensing element in contact with the surface of the piece to be analyzed and adapted to produce an output signal varying with variations in the radial distance of the surface of the piece from the said axis, said transducer means being mounted on the base and adapted to be held at a selected position relative radially to said axis and axially relative to said turntable, amplifying means for the transducer output providing an amplified signal, frequency selective network means to receive the amplified signal, and permit only a preselected frequency to appear as the network output, means to which the network output is applied responsive to the magnitude of the selected frequency signal and calibrated for display of radial variation of the test piece surface, said selected frequency being equal to the product of the relative rotational speed in revolutions per second and N, N being the number of a lobed condition for the absence or extent of which it is desired to analyze the test piece, means rotatable with the turntable providing a circumferential precision round surface precisely concentric with the spindle axis and radially fixed relative to a test piece, second transducer means having a sensing element in radial contact with said precision round surface, points of contact of said sensing elements lying in a common plane through the spindle axis, said second transducer means adapted to provide a signal corresponding to wobble in the spindle axis, and means for mixing the last said signal with a signal derived from the first transducer head to cancel any component in the latter signal due to said wobble.

12. In apparatus as set forth in claim 11, wherein the driving mechanism is adapted to effect said relative rotation at only a single constant speed, and wherein the said frequency selective network means is adjustable to pass any one of a selected group of distinct frequencies having harmonic relations to each other.

13. In apparatus as set forth in claim 12, having selectively operable means for completely by-passing said ampliefied signal by said frequency selective network for obtaining a total out-of-roundness display including eccentricity of the tested surface of the test piece relative to said axis.

14. In apparatus as set forth in claim 12, having selectively operable frequency selective means adapted to by-pass all of said amplified signal except a frequency equal to the constant rotational speed of said turntable.

15. In an apparatus for analyzing or testing the roundness of a test piece: a base, spindle means journalled in position axially fixed relative to the base, transducer means being mounted on the spindle for translation about the rotational axis of the spindle, said base including means for supporting a test piece in general axial alignment with said spindle axis for relative rotation between said transducer means and test piece about an axis, driving mechanism driving said spindle for effecting said relative rotation at only a single constant speed, said transducer means including a transducer head having a sensing element in contact with the surface of the piece to be analyzed and adapted to produce an output signal varying with variations in the radial distance of the surface of the piece from the said axis, amplifying means for the transducer output providing an amplified signal, frequency selective network means to receive the amplified signal and permit only a preselected frequency to appear as the network output, said frequency selective network means being adjustable to pass any one of a selected group of distinct frequencies having harmonic relations to each other, and means to which the network output is applied responsive to the magnitude of the selected frequency signal and calibrated for display of radial variation of the test piece surface, and said selected frequency being equal to the product of the relative rotational speed in revolutions per second and N, N being the number of a lobed condition for the absence or extent of which it is desired to analyze the test piece.

16. Appaartus as set forth in claim 15, having selectively operable means for completely by-passing said amplified signal by said frequency selective network for obtaining a total out-of-roundness display including eccentricity of the tested surface of the test piece relative to the spindle axis.

17. Apparatus as set forth in claim 15, having selectively operable frequency selective means adapted to bypass all of said amplified signal except a frequency equal to the constant spindle rotational speed.

18. In an apparatus for analzying or testing the roundness of a test piece: a base, spindle means journalled in position axially fixed relative to the base, transducer means being mounted on the spindle for translation about the rotational axis of the spindle, said base including means for supporting a test piece in general axial alignment with said spindle axis for relative rotation between said transducer means and test piece about an axis, driving mechanism driving said spindle for effecting said relative rotation at a selected constant rotational speed, said transducer means including a transducer head having a sensing element in contact with the surface of the piece to be analzyed and adapted to produce an output signal varying with variations in the radial distance of the surface of the piece from the said axis, amplifying means for the transducer output providing an amplified signal, freqency selective network means to receive the amplified signal, and permit only a preselected frequency to a appear as the network output, means to which the network output is applied responsive to the magnitude of the selected frequency signal and calibrated for display of radial variation of the test piece surface, said selected frequency being equal to the product of the relative rotational speed in revolutions per second and N, N being the number of a lobed condition for the absence or extent of which it is desired to analyze the test piece, means mounted on the base providing a circumferential precision round surface precisely concentric with the spindle axis and radially fixed relative to a test piece, second transducer means carried on the spindle having a sensing element in contact with said precision round surface, points of contact of said sensing elements lying in a common plane through the spindle axis, said second transducer means being adapted to provide a signal corresponding to wobble in the spindle axis, and means for mixing the last said signal with a signal derived from the first transducer head to cancel any component in the latter signal due to said wobble.

19. In apparatus as set forth in claim 18, wherein the driving mechanism is adapted to rotate said spindle at only a single constant speed, and wherein the said frequency selective network means is adjustable to pass any one of a selected group of distinct frequencies having harmonic relations to each other.

20. In apparatus as set forth in claim 19, having selectively operable means for completely by-passing said amplified signal by said frequency selective network for obtaining a total out-of-roundness display including eccentricity of the tested surface of the test piece relative to the spindle axis.

21. In apparatus as set forth in claim 19 having selectively operable frequency selective means adapted to bypass all of said amplified signal except a frequency equal to the constant rotational speed of said spindle.

22. A method for out-of-roundness analysis of a selected axial region of a surface of revolution on a test piece for absence of or the extent of an out-of-roundness condition corresponding to N lobes, comprising the procedure of: relatively rotating the test piece and a circuit component in proximity thereto responsive to variation of the distance of said surface therefrom at a selected constant speed of relative rotation to produce a signal varying amplitude correspondingly to variations of said distance, selecting a component from said signal corresponding to any out-of-roundness component of N number of lobes, said selected component having a frequency of N times the relative rotational speed in revolutions per X unit time, and measuring and translating the selected said component into units of radial variation of the test piece; N including as a one-lobed condition eccentricity of the test piece surface relative to the axis of relative rotation, and repeating said procedure for each of a plurality of lobed condition of distinct numbers N.

23. An apparatus for analyzing or testing the roundness of a test piece comprising: transducer means and means for supporting a test piece, said means being adapted for relative rotation between said transducer means and test piece about an axis, driving mechanism for effecting said relative rotation at a selected constant rotational speed, said transducer means including a transducer head having a sensing element in contact with the surface of the piece to be analyzed and adapted to produce an output signal varying with variations in the radial distance of the surface of the piece from the said axis, signal responsive display means calibrated for display of radial variation of the test piece surface, means including a frequency selective network, the last said means being adapted to receive a signal derived from the transducer and to apply to said signal responsive means only a signal having a preselected known frequency relation to any signal of the transducer, and a circumferential precision round surface precisely concentric with said axis and radially fixed relative to the test piece, and means including a second transducer head having a sensing element in contact with said round surface and adapted to provide a signal mixed in proper phase relation with a signal derived from the first transducer head to cancel any component in the last said signal due to any spindle error.

References Cited by the Examiner
UNITED STATES PATENTS

| | | | |
|---|---|---|---|
| 1,823,719 | 9/31 | Baker | 33—174 |
| 2,366,394 | 1/45 | Gerber | 33—174 |
| 2,457,727 | 12/48 | Rifenbergh | 33—179.56 X |
| 2,675,621 | 4/54 | Mims | 33—174 |
| 2,686,370 | 8/54 | Walker | 33—174 |
| 2,854,757 | 10/58 | Roeger | 33—174 |
| 2,965,971 | 12/60 | Pomernacki | 33—179.5 |

FOREIGN PATENTS

| | | |
|---|---|---|
| 1,230,164 | 7/59 | France. |

ISSAC LISANN, *Primary Examiner.*

LEONARD FORMAN, *Examiner.*

UNITED STATES PATENT OFFICE
CERTIFICATE OF CORRECTION

Patent No. 3,180,031                          April 27, 1965

Richard E. Roeger et al.

It is hereby certified that error appears in the above numbered patent requiring correction and that the said Letters Patent should read as corrected below.

Column 1, line 18, for "harmoic" read -- harmonic --; column 3, line 28, for "rotaitonal" read -- rotational --; column 5, line 39, after "below" insert -- both --; line 59, for "in", second occurrence, read -- of --; column 6, line 24, for "tuntable" read -- turntable --; column 7, lines 5 and 6, for "repectively" read -- respectively --; line 15, for "acros" read -- across --; column 10, line 44, after "single" insert -- constant --; column 14, line 17, before "amplitude" insert -- in --.

Signed and sealed this 21st day of December 1965.

(SEAL)
Attest:

ERNEST W. SWIDER                              EDWARD J. BRENNER
Attesting Officer                                  Commissioner of Patents